United States Patent
Lindsay

[11] Patent Number: 5,935,014
[45] Date of Patent: *Aug. 10, 1999

[54] GOLF SWING ANALYZING EQUIPMENT

[75] Inventor: Norman M. Lindsay, Bucks, United Kingdom

[73] Assignee: Zevo Golf Co., Inc., Temecula, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/522,412

[22] PCT Filed: Mar. 10, 1994

[86] PCT No.: PCT/GB94/00466

§ 371 Date: Dec. 26, 1995

§ 102(e) Date: Dec. 26, 1995

[87] PCT Pub. No.: WO94/20174

PCT Pub. Date: Sep. 15, 1994

[30] Foreign Application Priority Data

Mar. 12, 1993 [GB] United Kingdom .................... 9305115

[51] Int. Cl.[6] ................................................. A63B 69/36
[52] U.S. Cl. ............................................................. 473/222
[58] Field of Search .......................... 473/219, 221–226, 473/409; 364/410

[56] References Cited

U.S. PATENT DOCUMENTS

| | | |
|---|---|---|
| 4,063,259 | 12/1977 | Lynch et al. . |
| 4,451,043 | 5/1984 | Ogawa et al. ............................ 473/225 |
| 4,615,526 | 10/1986 | Yasuda et al. ........................... 473/222 |
| 4,732,390 | 3/1988 | McCollum ................................ 473/264 |
| 4,844,469 | 7/1989 | Yasuda et al. ........................... 473/225 |
| 5,108,105 | 4/1992 | Shimizu ................................... 473/225 |
| 5,114,150 | 5/1992 | Matsumura .............................. 473/222 |
| 5,318,296 | 6/1994 | Adams et al. ........................... 473/409 |
| 5,351,951 | 10/1994 | Hodgetts ................................. 473/409 |
| 5,351,952 | 10/1994 | Hackman ................................. 473/409 |
| 5,474,298 | 12/1995 | Lindsay ................................... 473/222 |

*Primary Examiner*—Jessica J. Harrison
*Assistant Examiner*—Mark A. Sager
*Attorney, Agent, or Firm*—Higgs, Fletcher & Mack LLP; Bernard L. Kleinke

[57] ABSTRACT

This invention is concerned with apparatus for diagnosing the characteristics of a golf swing, of the type in which one or more magnets attached to the golf club create signals in pick-up loops located near the ball position, or analysis to provide a readout of swing characteristics such as dynamic loft, dynamic lie (rake), impact position at the club-face, speed, and club face angle. Such apparatus is now improved by causing at least one loop or loop combination to be formed to provide at least two generally identical loop portions located side-by-side across the ideal swing path A–B with their respective adjacent edges parallel and closely spaced for defining therebetween a notional center line across the said path as an accurate sensed position. This is more accurate than sensing a single loop edge, and more sensitive. The respective loop portions, which can be formed from a single conductor or as two separate sub-loops, give balancing protection against the effect of extraneous electrical influence, and the increased accuracy and sensitivity can be used to decrease the overall extent of the loops in the travel direction. The club can possess magnets in the sole at the heel and toe, both inclined inwards at the top, to improve separation and decrease cross-talk. A method of club fitting in which the user selects optimum club characteristics for his established style of play is also disclosed.

26 Claims, 8 Drawing Sheets

GOLF SWING ANALYZING EQUIPMENT

CROSS-REFERENCE TO RELATED APPLICATIONS not applicable.

FIELD OF THE INVENTION

This invention relates to equipment for diagnosing departure from a preferred path or orientation, or other characteristics, of a object operated by a user in an attempt to follow that path correctly and in a desired orientation. In particular, it relates to an improvement in such equipment as described in our copending application WO 92/22358 for detecting, measuring and/or displaying differences for the desired ideal performance characteristics of a golf swing, and for convenience will be described herein in that context.

BACKGROUND OF THE INVENTION

In that earlier invention a golf club is provided with at least one permanent magnet typically held in a bore at a non-impact surface. Various configurations are possible, but a generally useful configuration is to provide two magnets held in bores at the back of the club, near the sole and equally spaced to either side of the central plane of intended movement of the club head, i.e. as "heel" and "toe" magnets, with their axes "horizontal" and parallel to that plane.

This club is used in conjunction with one or more loops of electrically conductive material, and in use in passed over a length of such loop to give an electrical signal. Using such a linear pickup gives better sensitivity than the use of point magnetic sensors for the club head metal, as known in earlier prior art. As each magnet crosses the linear pickup a characteristic "zero-cross" signal is produced, with a number of measurable characteristics. The moment of cross-over relates to the zero value of this function. The symmetry of the zero-cross function is affected by tilt of the magnets, i.e. tilt of the club face in one or other direction. The shape of the zero-cross function is related to minimum distance of magnet from pickup, as it crosses, being thus a measure of height or (as difference of height between two magnets) a measure of rake of the shaft.

Use of a number of inductive loops of different shape and placements in relation to a designed ball position (such loops being for example fabricated into a suitable mat) can thus give a multiplicity of signals, of varying shapes, symmetries and delays, from which a processing unit can derive numerical values for angles (of loft, slice, hook or rake) speed, and displacements from an ideal path.

SUMMARY OF THE INVENTION

The equipment of the prior invention, and of the present invention, can be used for two main and related purposes.

One is to provide, for a person desirous of improving his technique, a detailed analysis of all aspects of his club movement so that remedial action can be taken. In this mode the equipment will find utility in golf driving ranges, clubs, leisure centres, hotels and like establishments, being readily embodied in a coin-feed version if so desired.

The other purpose is concerned with providing clubs for use by experienced golfers. Each such golfer has individual characteristics which dictate the optimum choice of club, for example physical height and reach, stance, speed of swing and general playing technique. This equipment can be used to quantify the dynamic elements of these characteristics and thus to indicate clubs suited for that particular golfer. In practice, it is envisaged to supply at point of sale a range of clubs and to select from that range, after a plurality of shots using a known, magnetically-modified, club over the detecting loops of the present equipment, the optimum club to match personal characteristics. Equipment used for this latter purpose may be a simplified version of the fully diagnostic equipment, and can even be of a much simplified nature usable only to test, e.g. speed, dynamic lie (rake) and/or dynamic loft. Alternatively, the standard diagnostic equipment can be provided, but with some circuits switched off or disenabled.

Additionally to the above main uses, the equipment can itself be used in a game or competition mode, either for a complete set of holes, or e.g. in a driving or putting competition. The man skilled in the electronic art will have no difficulty in designing suitably modifying circuitry to permit such use.

The present invention sets out to provide an improved version of such equipment in which the shape of the induction loops has been modified. As described below, embodiments can consequently be designed which have higher timing accuracies and/or higher sensitivities, and/or innate resistance to extraneous electromagnetic fields; and which moreover can use less power, so that a battery-driven embodiment will last longer between battery changes.

In one aspect the invention consists an apparatus for detecting, measuring and/or displaying differences from desired ideal performance characteristics of a golf swing, comprising: at least one golf club having attached in relation to the club head at least one permanent magnet at a predetermined location and orientation relative to the club face; a detector array having a ball-position indication, and comprising at least one sensor, for a magnetic field, located in a predetermined sensing position relative to the desired ideal path of the club head over the ball position indication; and readout means electrically connected to the detector array to convert one or more electrical signals produced by said sensor by swing of the golf club into a form suitable for a detection signal, or for measurement or display, characterised in that the sensor is a plane loop, or loop combination, configured to provide at least two generally identical loop portions located side by side across the said ideal path with their respective adjacent edges parallel and closely spaced for defining therebetween a notional centre line across the path as a sensed position.

The loop portions are typically of a parallelogram shape. The end edges of the parallelogram loop portions are preferably themselves aligned, and the parallelograms are preferably rectangles (including squares within that term).

The loop configuration as utilized in the present invention can be provided in two main forms, namely a unitary form or a combined form. The unitary form provides the defined configuration from a single length of wire or the like conductor, shaped into the two parallelograms (e.g. rectangles) with a suitable electrical insulation expedient at any cross-over point, and with the respective free ends connected to processing and readout means for the signal. The combined form provides the defined configuration from two identical side-by-side parallelograms (rectangles) each connected to the electrical circuitry for processing and readout, but via means permitting effective signal summation.

It will be appreciated that the configuration resembles to some extent the figure "8" but with a transverse and doubled centre bar and a parallelogram e.g. rectangular format.

It will also be appreciated from studying the earlier application that the possibility is discussed therein of using two parallel plates with a defining sensed gap between them. The present invention however, as discussed in more detail below goes beyond such a concept to provide a loop configured to define spaced elements themselves defining a central sensor line.

Our earlier application WO 92/22358 (GB 92/01105) moreover envisages to form the array from a plurality of loops at predetermined locations and orientation in relation to the ball indication position, the loops being electrically insulated from one another and collectively therefore permitting a multiplicity of separate signals to be detected and analysed or converted to a suitable form for measurement and/or display for each swing of the club. Preferably, such loops are of equal extension in the plane of magnet travel.

Generally, one or more of such loops, in accordance with the present invention, may be replaced by the configured 'figure-of-eight' loop, as defined above, with advantages as discussed below. It will be appreciated that although the notional centre line is a primary sensor datum, the other parallel loop edges can also be utilized for sensing and comparison purpose.

The number of magnets attached in relation to the club head can vary although, since their respective fields should not overlap to the extent that confusion arises, a small number of magnets, specifically one or two magnets, is preferable. These can be fixed at the sole of the club or at the back of the club. If only one magnet is used it will preferably be located in a recess in the central plane of the club (in the sole or at the back) i.e. that plane in which a hit ball will generally travel. If two magnets are used they can be spaced fore-and-aft in this plane, again in suitable recesses in the sole. This configuration is more suitable for wooden clubs. Alternatively, they can be equispaced to either side of the central plane, in which case it is preferred for the magnets to lie in such recesses at the back but near the sole. This configuration is more suitable for irons or a putter.

The magnets may be held in the recesses with their magnetic axes in the general direction of ball travel path; or at right angles to this path and generally "vertical" (in relation to a club held at rest on the ground); or possibly even at right angles to the path and generally "horizontal" (again in relation to the grounded stationary club). Where two magnets are used, and when these are spaced by a predetermined amount e.g. equispaced to either side of the central plane (of desired travel) at the back or in the sole it is preferable to orient them in opposition i.e. with the N poles facing in opposite directions, to give easily distinguishable signals. If two magnets are spaced fore-and-aft in the sole, they can either be opposed or lie in the same direction.

One preferred range of such spacing is usually from 50 mm to 110 mm. For example, magnets in the sole of a wood, or back of an iron, are typically spaced at 60 mm; at the back of a putter 100 mm is preferred.

Further arrangements of magnets may also be used, possibly depending to some extent upon the primary purpose for which the equipment is installed, as discussed above.

Our prior application discloses the use of two magnets lying horizontally and spaced apart at the rear face of the club. This combination can be used for all of the detection purposes indicated, but we have now found that for a "wood" or "iron" (referring to historic styles of club rather than necessary materials of construction) there is a valuable alternative placement of two magnets, separated to either side of the club-head median line and at the sole of the club, more preferably at the heel and toe regions where the sole begins to trend upwards. In such a placement the magnets could be essentially "vertical" i.e. with their longitudinal axes orthogonal to the surface of the ground at the bottom of the swing. Preferably, however, they are each located at angles to the vertical in the plane at right angles to the swing. The angles of each to the vertical are typically the same and e.g. from 10° to 40° such as 20°. As described in more detail below, such an arrangement provides a sensitive and characteristic signal for each magnet (especially when used with a ferromagnetic club), and moreover slightly reduces "crosstalk" between the signals, i.e. the influence of the heel magnet in the toe region and vice versa. Such magnets can also be readily located at somewhat greater distances than in the first two-magnet embodiment, e.g. at 75 mm or more, which further significantly reduces "cross-talk".

Another magnet arrangement suitable for use (especially with custom-selection equipment of a simplified nature) is that of a single magnet at the centre of the sole, whether horizontal, orthogonal to ground, or tilted. Processing of the various signals from such a single magnet gives, in addition to speed of swing, information about dynamic loft (related to the actual orientation on impact of the face of a driver or like club in vigorous use at the end of its resilient shaft) which is a key feature in choice of such a club, even though as a single magnet embodiment it cannot give signals relevant to dynamic lie (shaft rake).

We have also discovered that there are several types of magnet mixing suitable for use. While, for high-impact clubs some form of securing within an accurately dimensioned recess is usually preferable, it is possible to allow some magnet projection, especially on faces remote from impact or otherwise advantageously located e.g. the upwardly slanting heel and toe regions of the sole as discussed above. For a putter, (and especially for the protected environment of a store using the custom-selection equipment) it is possible merely to adhere the magnets, e.g. at marked positions. It is even possible that two magnets may be adhered (typically symmetrically and by their cylindrical bases) at the respective heel and toe regions of the front face of a putter, away from the impact zone, to give a club readily usable for custom-choice of a putter, or for a simple "putting" game mode.

The magnets used are preferably the so-called "rare-earth-based permanent magnets", which can be fabricated in small sizes with high strengths as measured by their "BH product". The NdFeB type of magnets, said to be approximately $Nd_2Fe_{14}B$, or the socalled "$SECo_5$" magnets, as available under the Registered Trade Marks Vacodym and Vacomax from Vacuumschmelze GmbH of Hanau, Germany, when made up in cylindrical shape, 5–10 mm diameter and 3–10 mm length, e.g. 8 mm diameter and 5 mm length, (the larger sizes are more suitable for putters) and axially magnetised with a BH product measured in $KJ/m^3$ of 50–350, more preferably 200–300, which magnets have a resistance to impact demagnetisation, are valuable in the practice of this invention.

The loops themselves may be composed of wire, possibly wound in a number of turns, or may be flat conductive ribbons of material or lines on a printed circuit board. The actual width of the lines does not appear to be critical.

Preferably the detector array is configured as a composite expanse comprising the loop as discussed above, with the two portions electrically insulated one from another and from their surroundings, the upper surface of which expanse shows the ball position indication, and further comprising electrical connection means to connect the detecting, measuring or display device. The expanse can be a more or less rigid, impact-resistant plate if configured for woods or irons, but can be less strong e.g. a flexible mat if only putting characteristics are to be measured. It is valuable if an area of low-reluctance magnetic material is located beneath the loops to enhance signal strength. The expanse could alternatively be of a periphery to allow placement around a ball in play e.g. on a putting green, to record and analyse the putting swing.

The readout means of the apparatus for detection, measurement or display could be simply an intersection signal, to give an audible or visible indication of fault. More preferably, it compries a digital or analogue readout, of one or more parameters, obtained by computation based upon combinations of signals received from different loops. Such computation may be summarised on a display screen of a notional golf hole, showing where the ball would have travelled if hit with the recorded and analysed swing.

The invention extends to the combination as defined either with a whole set of clubs, or a selected sub-set of clubs e.g. one wood, one iron (such as a 5-iron) and optionally one putter, all suitably provided with a magnet or magnets. The magnets can be differently arranged depending on the type of club.

Other aspects of the invention include a golf club head per se suitably provided with magnets as discussed above, and a mat comprising the detector array of loops also as discussed above.

In particular this aspect envisages a golf club head, or golf club comprising such a head, suitable as a wood or iron and having two magnets, located in recesses spaced to either side of the central plane of the head at the heel and toe regions of the sole portion of the club, with their magnetic axes lying generally in that plane perpendicular to the line of travel of the club head and inclined inwardly e.g. at 10°–40° at their upper ends. As indicated above, such tilt decreases the "cross-talk" between magnets. It is also easier to fabricate if the heel and toe regions of the bottom edge of the club are used for placement.

In a yet further aspect the invention consists in a method for user selection of an optimised golf club which comprises the steps: of providing for selection a range of golf clubs of different user characteristics; providing at least one diagnostic club of predetermined characteristics, having located at the head thereof one or more suitably oriented magnets as described above; providing diagnostic apparatus of the type described above; making available such equipment for a user to effect a plurality of strokes of a like nature using the, or a chosen, diagnostic club; and thereafter selecting from the available sale range, and in the light of the recorded diagnosed results, a club to optimise user performance.

Selection of a particular club may be effected by consultation of a look-up table in the memory of the apparatus. For example, as hereinafter explained in greater detail, the diagnostic apparatus can indicate a certain "rake" position of the club head during a swing of the club. The rake indication can then be used to determine the specific face orientation of the selected particular club. Similarly, as mentioned previously, an indication of the actual orientation on impact of the face of the diagnostic club determines the dynamic loft of the selected club.

DESCRIPTION OF THE DRAWINGS

The invention will be further described with reference to the accompanying drawings in which.

BEST MODE FOR CARRYING OUT THE INVENTION

Figure 1:
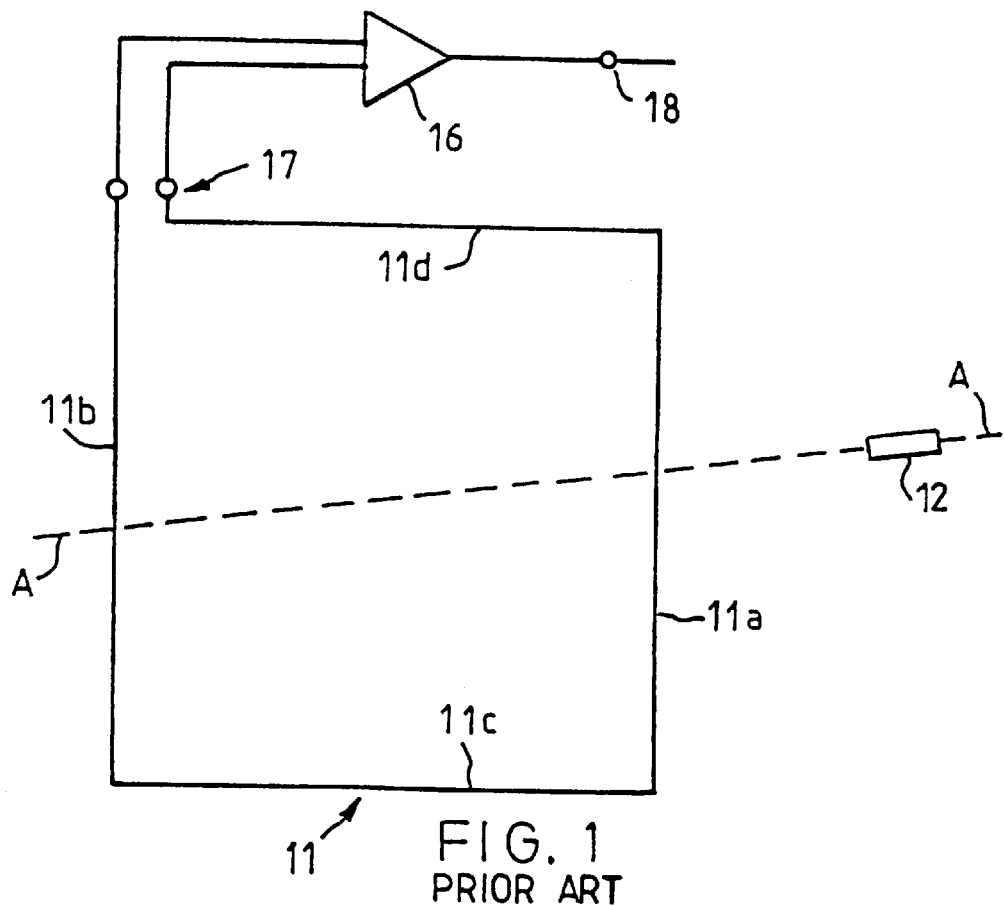
FIG. 1 shows a loop of electrically conductive material and the travel of a magnet over such a loop of a magnet, all as used in the prior art.

In FIG. 1, a loop 11 of electrically conductive material has a rectangular shape with a front edge 11a, a rear edge 11b and two connecting edges 11c, 11d. A magnet 12 passes over the loop, and gives a signal whenever it passes closest to one or other edge. As shown, edge 11a is used to form this signal for pickup across connectors 17 and amplification at amplifier 16 for processing at 18.

Figure 1A:
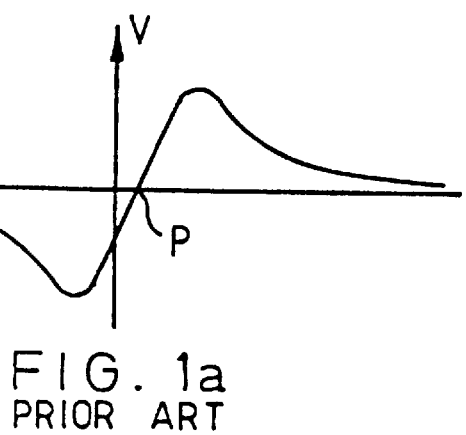
FIGS. 1a and 1b show typical zero-cross time-dependent waveforms generated by the loop of FIG. 1 and illustrate the certain systematic inaccuracies which may arise.
Figure 1B:
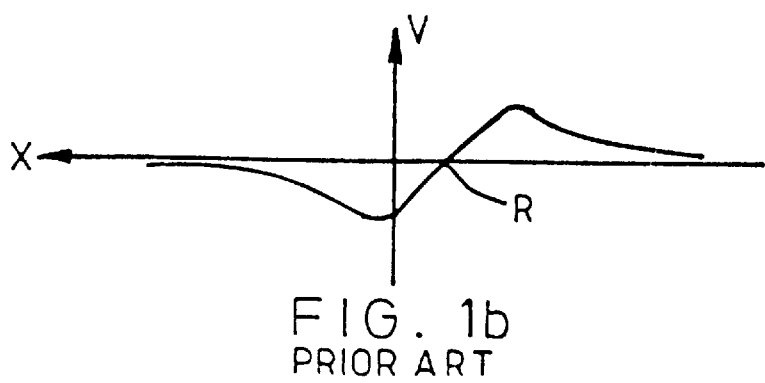

As magnet 12 passes over the loop edge 11a e.g. along path A the respective poles induce a signal, first in one direction and then in the other, theoretically as shown in FIG. 1a, this being termed a zero-cross signal. FIGS. 1a and 1b in each case show the instantaneous voltage V at 18 (FIG. 1) against the instantaneous position X of the magnet 12. (A similar signal, of reversed polarity will be given at edge 11b). The time the magnet crosses the edge 11a is shown generally by the cross-over point P. If when crossing this line the magnet was higher then the signal is less strong, as shown in FIG. 1b. However, a cross-over point R is still readily detectable. If and to the extent that measurements are being made of signal amplitude as a measure of distance, the signal of FIG. 1b is less sensitive than that of FIG. 1a.

When these signals are measured to high timing accuracies, however, systematic error will arise. This is inherent in the nature of the loop 11; essentially, to one side of edge 1a the field dies away to infinity, but to the other side it is affected by the necessary existence of return loop edge 11b. The upshot is that the perceived electrical crossover point P is advanced from the true mechanical crossover point. Moreover, the amount of such advance increases if the magnet traveses edge 11a at a greater distance (height), i.e. perceived R is advanced more than perceived P. Thus, measurement of speed using two such separate detector loops, (which are typically traversed at different heights) could be slightly inaccurate. Also, in a typical Preferred prior art embodiment two loops 1 are placed with their respective edges 11a aligned and, perpendicular to either side of an ideal path, so that where two magnets are used in a golf club, one traverses one loop and one the other. In such an instance differences in the two arrival times are processed to indicate a misorientation of the club face, while differences as between the function amplitudes can be an indication that one magnet traverses its loop edge 11a at a different height from the other magnet over its loop edge, i.e. that the clubshaft is raked improperly. However, because the perceived crossovers P and R are advanced by different amounts the processing unit "sees" such improper rake as affecting face orientation even though the club face may actually be accurately aligned.

Figure 2:
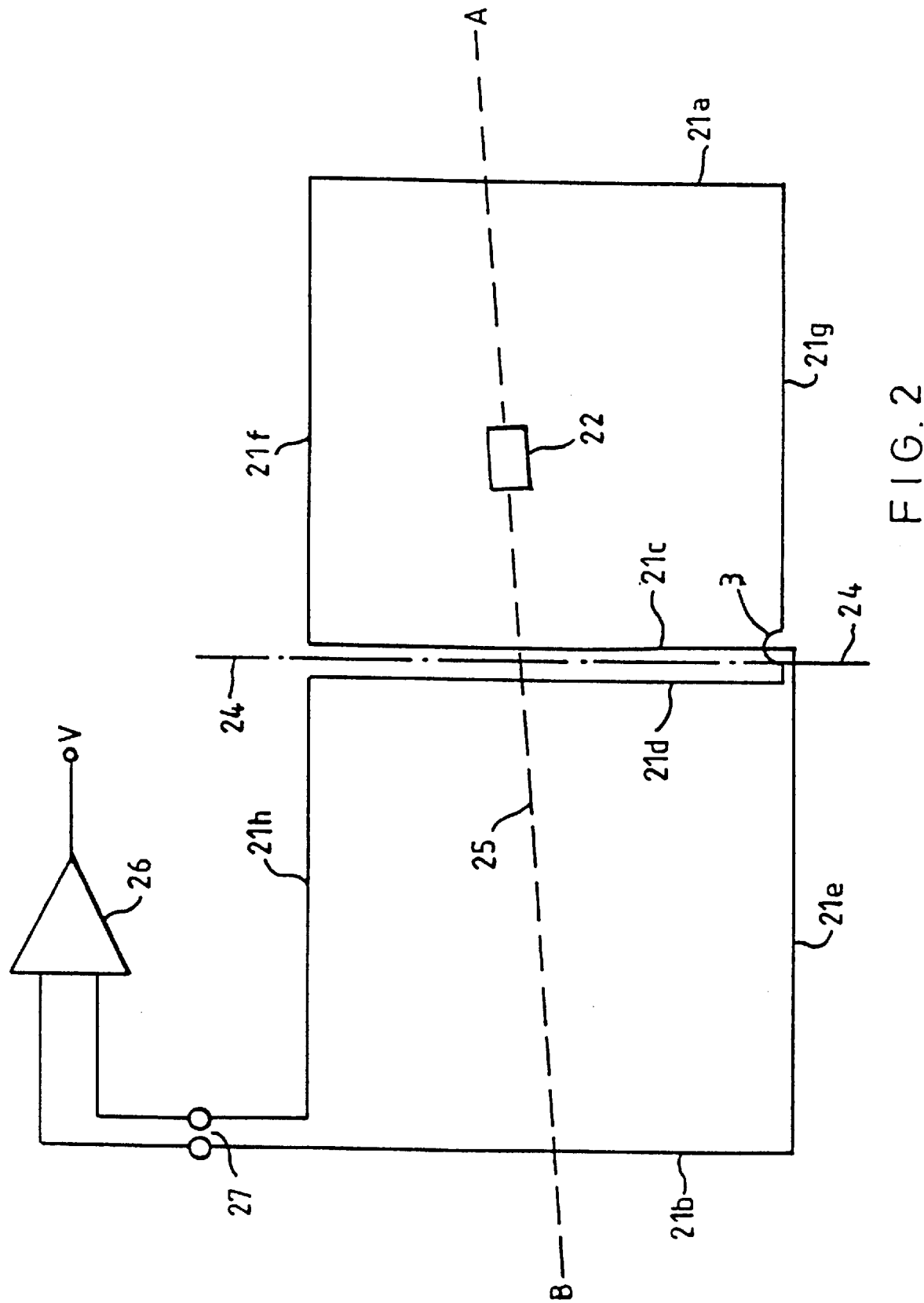
FIG. 2 shows one embodiment of a loop design in accordance with the present invention, and a travelling magnet.

FIG. 2 shows in analogous form an embodiment of one proposed loop configuration for use in the equipment of the present invention.

This loop 21 has a front edge 21a, a rear edge 21b and two parallel closely spaced straight intermediate edges 21c, 21d, the loop being completed by top and bottom edges 21e, 21f, 21g and 21h, and the sequence being 21b-21e-21c-21f-21a-21g-21d-21h, between connectors 27 leading to amplifier 26 and the processor unit V. Magnet 22 traverses the loop 21 along path 25 from A to B.

The spacing between parallel portions 21c and 21d is small, and a notional centreline 24 runs down the centre of the narrow area thus defined between 21c and 21d. The separation distance is typically a few millimeters, or as little as is consistent with accurately maintained separation, and is small compared with typical height of magnet travel over the centreline.

For convenience, such a loop will be referred to herein as a unitary figure-of-eight loop. In practice all such loops, whether unitary figure-of-eight, or combined figure-of-eight as discussed below have a closely spaced parallel double edge configuration defining the centreline.

Figure 3:
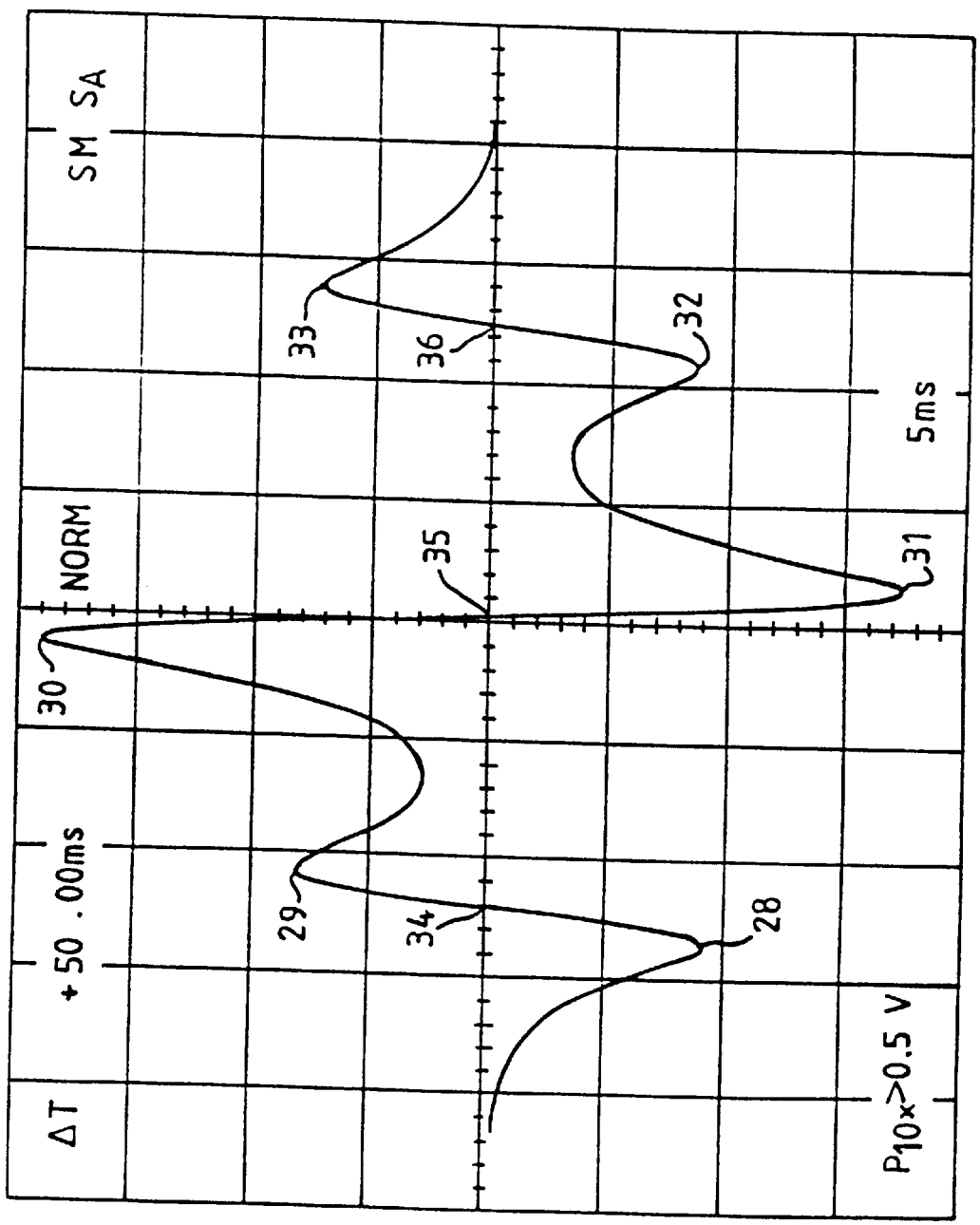
FIG. 3 shows a time-dependent waveform of a signal generated by the loop of FIG. 2 and the magnets.

FIG. 3 shows the complete signal when a magnet 22, crosses the whole loop from A to B. This signal has peaks 28, 29, 30, 31, 32 and 33. There are also three crossover points 34, 35 and 36. The signal strength at peaks 30 to 31 is approximately twice that which would be given by a simple zero-cross function with a signal loop edge. Thus:

(a) The perceived cross-over time at centre-line 24 is accurate because of the symmetrical unitary figure-of-eight loop structure, and stays accurately the same over a range of magnet heights.

(b) The amplitude at effective crossover (at 24) is doubled, thus increasing sensitivity and signal-to-noise ratio.

(c) The symmetrical nature of the unitary figure-of-eight loop balances out extraneous interfering electrical signals such as those produced by other equipment in the vicinity using mains power In our prior art proposal special separate balance loops were provided for this purpose.

Also, advantage can be attained by arranging for the electrical circuitry to lapse into a low-power-consuming stand-by mode between swings, and to be activated by a wake-up signal produced in dependence on initial peak 28 as the club descends. This expedient increases battery life by decreasing power-consumption.

Figure 4:
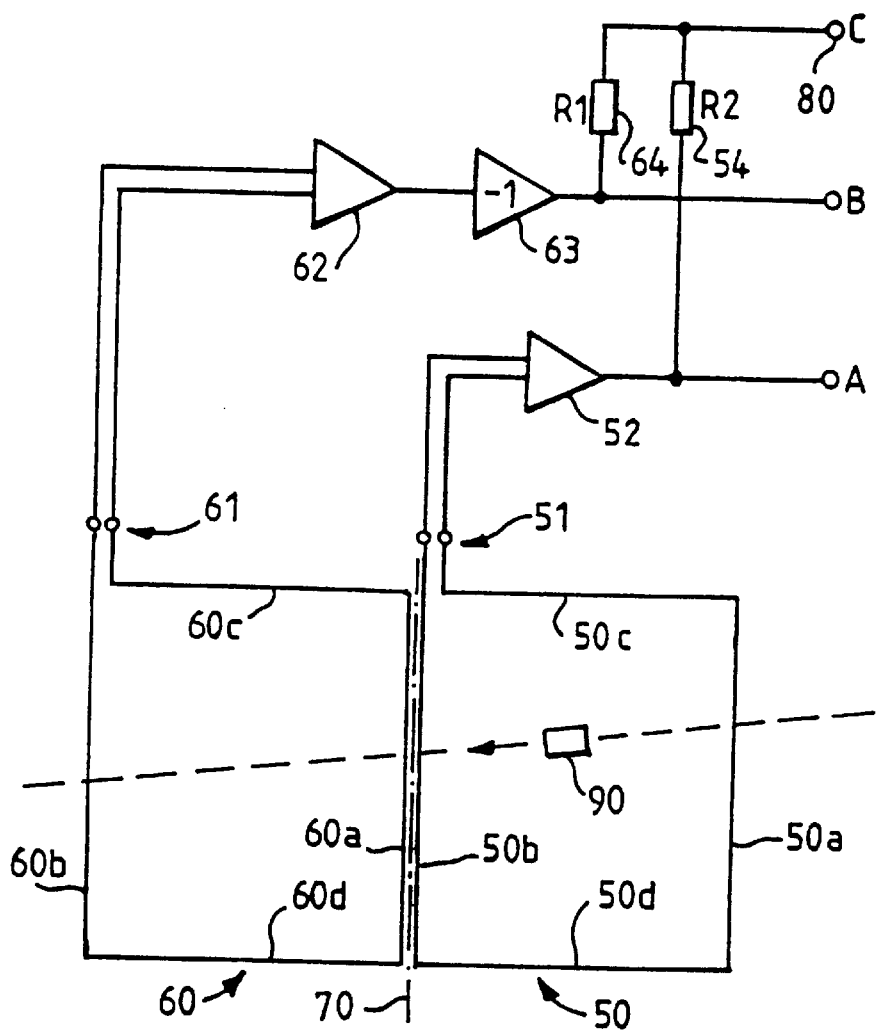
FIG. 4 shows another embodiment of loop design in accordance with the present invention, and a travelling magnet.

FIG. 4 shows analogously to FIG. 2 an embodiment of another loop configuration for use in equipment of the present invention.

Because of its shape and relationship to the configuration shown in FIG. 2 this loop is referred to for convenience as a "combined figure-of-eight" loop. It is a combination of two mechanically separate loops the signals from which are combined and processed.

The two separate loops 50 and 60 have front edges 50a, 60a, rear edges 50b, 60b, top edges 50c, 60c and bottom edges 50d, 60d. The respective loops are the same size and shape, and rear edge 50b of loop 50 and front edge 60a of loop 60 are parallel and closely spaced, under the same conditions as edges 21c, 21d of the unitary figure-of-eight loop of FIG. 2, to define a notional centreline 70 (FIG. 4).

The loop are separately provided with electrical connection at 51 and 61, each connection leading to amplifiers 52 and 62, of equal gain. One of the amplifier signals, from 62 as shown, is hen inverted at 63, and the combined signal is taken off through equal resistors 54, 64 to give a combined signal for onward processing at 80.

The signal at 80 is generally similar to the signal produced from a "unitary figure-of-eight" loop as discussed above. It can be utilised in particular to determine the exact moment of passage of the magnet 90 across the notional centreline 70.

The man skilled in the art will appreciate that an additional amplifier, and additional summing components are required for the "combined figure-of-eight" loop in comparison with the requirement of the unitary loop of FIG. 2, and moreover that this can lead to a slightly degraded signal i.e. a signal of lower signal-to-noise ratio. However, these disadvantages are counteracted by the availability of different signals.

Figure 5:
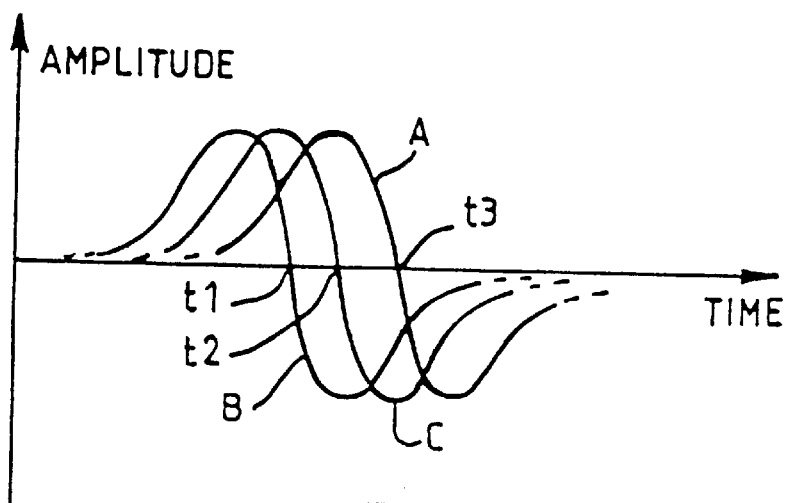
FIG. 5 shows time-dependent waveforms of a signal generated by the loop of FIG. 5.

FIG. 5 shows the signals output at A, B and C, resulting from a magnet 90 traversing on the dotted line, $t_1$, $t_2$ and $t_3$ being the perceived crossover points. The combination of two separate loops in a combined figure-of-eight loop gives three signals which in turn provide a method of detecting height and tilt.

The signals thus generated can be processed as time events only. (From these time events height and tilt data can be extracted). The unitary figure-of-eight loop, by contrast, requires both signal and amplitude time event processing.

In FIG. 5 perceived $t_2$ is accurate for the mechanical crossover of centreline 70 (as in FIG. 2). The time difference between perceived $t_3$ and perceived $t_1$, varies with speed and with the height of the magnet above the loop plane. Any time inequality between perceived $t_2$ and perceived $t_1$, and between perceived $t_3$ and perceived $t_2$ is a measure of tilt of the magnet.

Figure 6:
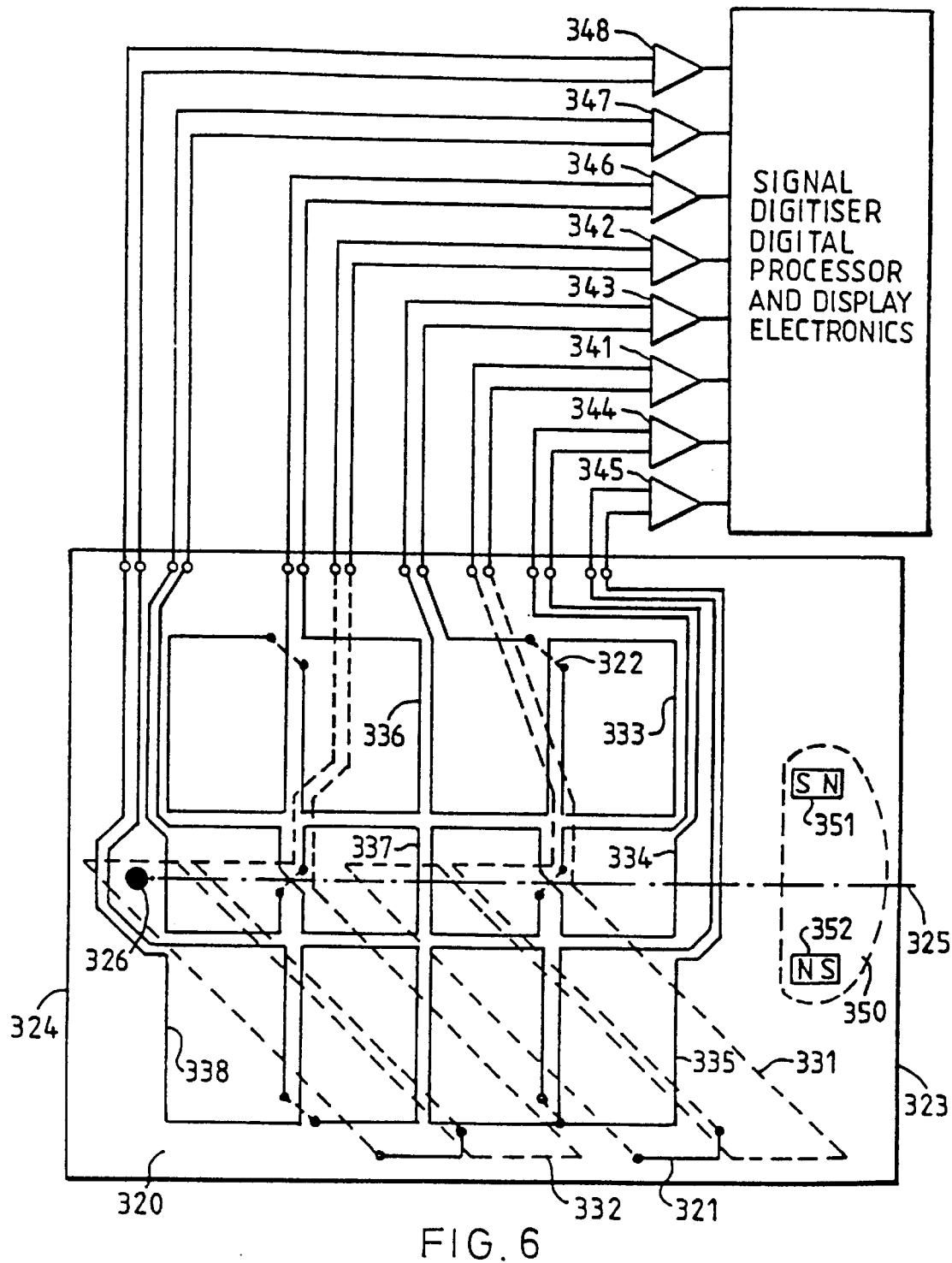
FIG. 6 shows an arrangement of loops as illustrated in FIG. 2, which can be arranged on a plate or mat, for use with a golf club carrying two magnets.

FIG. 6, shows a loop configuration of equipment according to the invention, comprising a number of rectilinear "unitary figure-of-eight" loops formed by tracks on a double-sided through-hole-plated printed circuit board 320, connected to amplifiers 341–348 and signal processing circuits as shown.

Each circuit track forming a "unitary figure of eight" loop has at least one section (typical examples are shown at 321 and 322) which cross over or under the main track and electrically connects to the main track by through-plated holes. For convenience, the printed circuit board 320 is designated with a right hand edge 323, a left hand edge 324, an array centreline 325 and a tee position 326. Two printed circuit tracks 331, 332 on the downward-facing side of the printed circuit board each form a "unitary figure-or-eight" loop having lengthwise sections of track sloping at nominally 45 degrees to the centreline 25. The sloping sections of tracks 331 and 332 are substantially straight and parallel. The ends of he "unitary figure-of-eight" loop formed by track 331 are connected to the inputs of amplifier 341 and the "unitary figure-of-eight" loop formed by track 332 is connected to amplifier 342. Three printed circuit tracks 333, 334, 335 on the upward-facing side of the printed circuit board each form a "unitary figure-of-eight" loop, connected to amplifiers 343, 344 and 345 respectively.

The lines of symmetry of the three "unitary figures-of-eight" formed by tracks 333, 334 and 335 are co-linear and perpendicular to the centreline. The "unitary figure-of-eight" formed by the track 334, encloses an area which is approximately symmetrical about the centreline 325. The "unitary figure-of-eight" formed by tracks 333 and 335, is adjacent to track 334 and encloses areas above and below track 334.

A further three "unitary figure-of-eight" configurations are formed by tracks 336, 337 and 338 in a configuration similar to tracks 333, 334 and 335 but displaced to the left. The ends of the "unitary figure-of-eight" loops formed by tracks 336, 337 and 338 are connected to the inputs of amplifiers 346, 347 and 348.

The magnets 351, 352 are attached to the clubhead 350 typically being embedded within the body of the clubhead 350. A toe magnet 351 is positioned near the toe of the clubhead and a heel magnet 352 is positioned near the heel of the clubhead. The magnetic axes of both magnets are substantially parallel to each other and to the sole of the clubhead, and are aligned along the normal direction of swing. The line joining the centres of the magnets is substantially perpendicular to the magnetic axes, the centres being separated by a known distance. The polarity of the toe magnet is arbitrarily chosen with a South pole leading in the swing direction, and that of the heel magnet is reversed so that the North pole is leading.

During the execution of a golf swing, the heel and toe magnets pass over the various "unitary figure-of-height" loops and corresponding signals are generated and amplified in the eight amplifiers 341 and 348.

The heights of the "unitary figures-of-eight" formed by the tracks 334 and 337 (measured along a perpendicular to the centreline 325) are chosen to be somewhat smaller than the separation distance between the two magnets. As a consequence, when the swingpath is nearly straight and centred on the tee position, relatively little voltage is induced in the loops formed by the tracks 334 and 337, compared to the voltages induced in all the other loops. However, when the swingpath is off-centre such that one or other magnet passes over the tracks 334 and 337, voltages are induced in these loops with magnitudes equal to or greater than the voltages induced in the off-centre loops. In this manner the swingpath can deviate to some degree on either side of the array centreline 325, and signal content associated with the heel magnet can be discriminated against signal content associated with the toe magnet. The amplified signals from all eight channels are periodically sampled (typically at 50 microsecond intervals) and the instantaneous value of the signal in each channel is stored as a digital value (typically 8 bits plus polarity). The sampled data representation for the sensor array signals is then sorted and processed to decode and display various swing parameters.

When either magnet 351 and 352 passes over one or other unitary figure-of-eight loops, a signal in the form of that depicted in FIG. 2 is generated in those loops. The processor examines the sequential data in all eight channels and executes the following initial computations:

a) The sequence and polarity of the major peaks emanating from the central unitary figure-of-eight loops 334 and 337 are examined to identify these signals as being generated by either the toe magnet or the heel magnet, and depending on this test, the signal from loop 334 is added to that of loop 333 or loop 335, and similarly, the signal from loop 337 is added to the signal of loop 336 or 338.

b) Having combined the signals as described in (a) the resultant six remaining signals are examined and the magnitude of the two major peaks (one positive, one negative) relative to the quiescent or zero signal values are determined.

c) The position of both major peaks in each of the six signals in relation to an arbitrary time frame is determined and also the time position of the signal zero crossings between the peaks is determined.

From the above, all the data necessary to compute various components of a clubhead's vector velocity and orientation are available.

The configuration for "unitary figure-of-eight" loops as depicted in FIG. 6 shows, For clarity, each unitary figure-of-eight" occupying a separate part of the printed circuit board area. In practice, the "unitary figures-of-eight" may overlap in order to increase the catchment area for the sensed magnetic fields. This entails, in general, an increase in the required number of cross-linking track sections (similar to section 321 and 322).

Alternative methods of fabricating the sensor array include the use of conductive print techniques to create cross-linking sections or use of "stitched wire" construction where the required track patterns and connections are formed from insulated wire.

A consequence of the loop combination used in the practice of this invention is that the overall loop dimension measured in the direction of travel of the magnet can be reduced, even compared to the single loop of our prior proposal. This is because when designing a single loop, as in this prior art, enough separation is required between the front and back edges to minimise the lag or lead of the electrical crossover signal compared to the mechanical crossover point, and this requires a large loop. In the present invention, the central doubled edges define the key measurement line, and the proximity of the combined loop front and back edges does not affect accuracy, so a smaller overall dimension can be achieved.

It follows from this that the two loops referred to in the description and definition of the present invention, whether portions of a unitary loop, or electrically separate part of a combined loop may themselves be cart of a multiple, or higher-order, loop arrangement. In other words, the use of two loop portions can be fulfilled by the presence of three or more such portions. The overall dimensions are still acceptably constrained.

Figure 7:
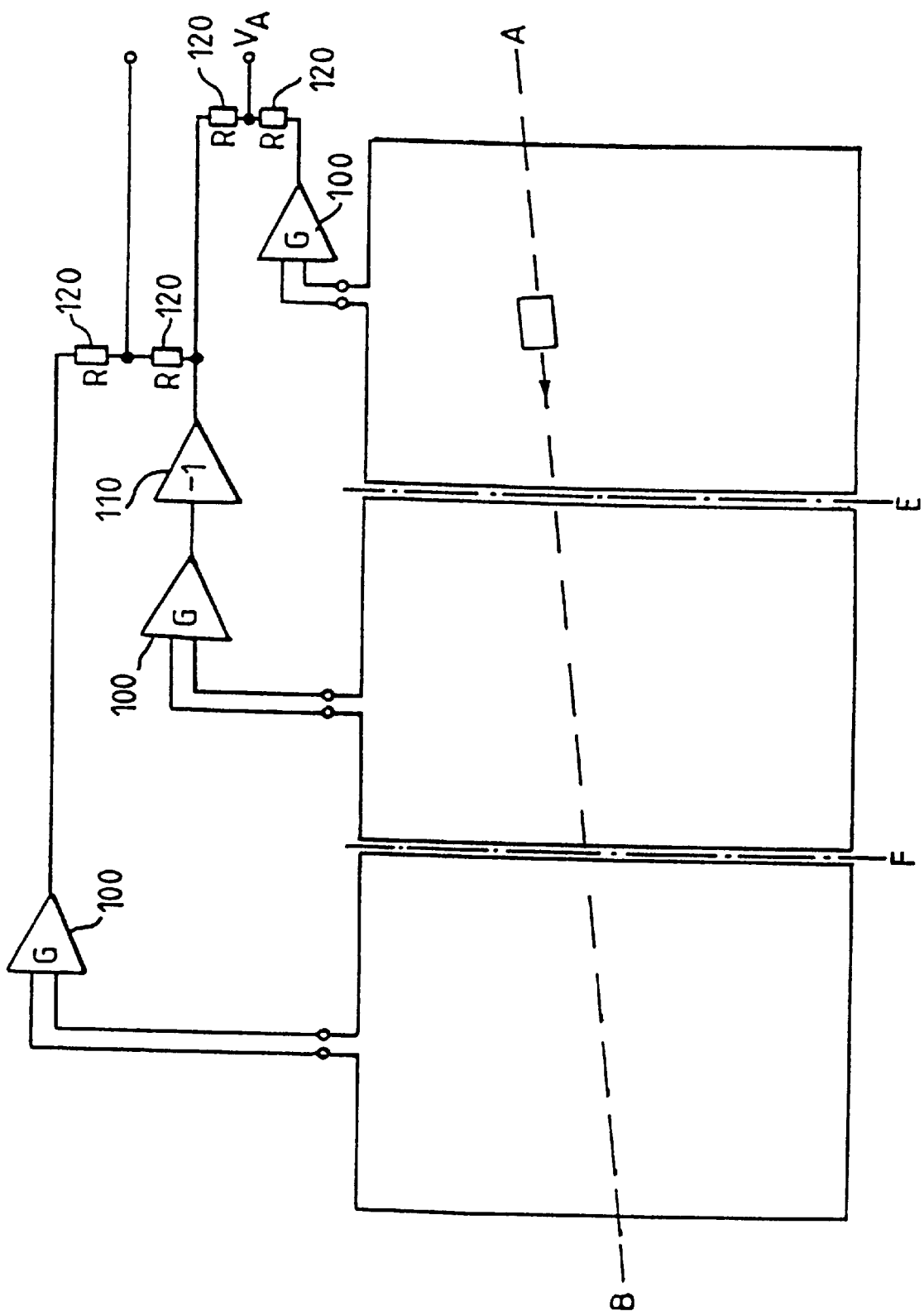
FIG. 7 shows another embodiment of loop design in accordance with the present invention.

FIG. 7 shows in a format generally equivalent to that of FIG. 4 a system of three loops, electrically separate, combined into a combined loop. This loop defines accurate timing centrelines E and F, traversed by magnet along path A–B and connected to a common output Va by amplifiers 100, inverter 120, and resistors 130. The remaining features of FIG. 7 can be established by reference to FIG. 4, and a combined signal with two accurately timed cross-overs, of the improved characteristics discussed above, can be generated and processed.

Figure 8:
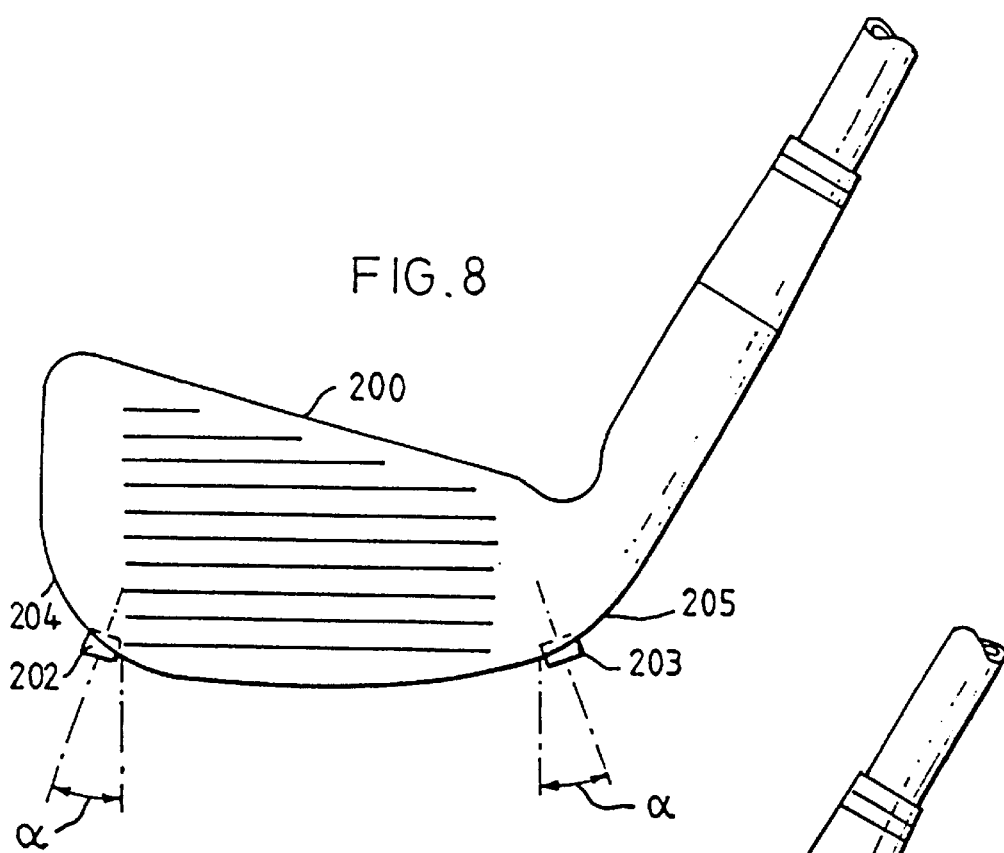
FIG. 8 shows a particular alternative embodiment of magnet placement.

FIG. 8 shows from the front the head 200 of an iron carrying in suitable recesses a cylindrical toe magnet 202 and a like cylindrical heel magnet 203, each in the embodiment shown being located to project slightly from the club head. The bottom of the club head, at the heel and toe regions 204, 205 rises slightly whereby the projecting portions of the magnets are, to some extent at least, safeguarded from contact with the mat (not shown).

The magnetic axes of the two magnets 202, 203 are inclined inwards as shown, while remaining in the general plane of the club head. It is preferable but not essential to locate them both at the same angle x of incline, e.g. 20°, but different angles could be used.

Because the extreme ends 204,205 of the club head are used to locate the magnets 202, 203 (whereby their spacing is maximal) and because the magnets are tilted as shown there is much reduced signal "cross-talk" between the two magnets as they cross the relevant signal-measurement location.

In practice the use of ferromagnetic "irons" or "woods" gives a higher amplitude signal than non-ferromagnetic materials in the embodiment shown in FIG. 8.

This embodiment as shown can be used (as described below) to give a range of signals useful for a fully diagnostic machine. It is however also suitable for club-fitting or club-selection equipment of more limited criteria and simpler construction. In such equipment, for example, the use of "either" loops, to distinguish the signals from the respective magnets, might be dispensed with since "and" loons give information relevant to dynamic loft i.e. the actual vertical impact angle with the ball which can only be ascertained for a given user dynamically, by actual strong use of the club, rather than statically.

While the loops in the mat can be modified, or selectively used, it is also possible to modify magnet type and placement. For example, a further simplification would be to attach the magnets externally, i.e. adhered and located as shown, but not recessed. This is a more mechanically fragile arrangement but may be adequate (and would be easily repairable) in a store selling the optimal customised clubs based on diagnosis of key criteria.

Figure 9A:
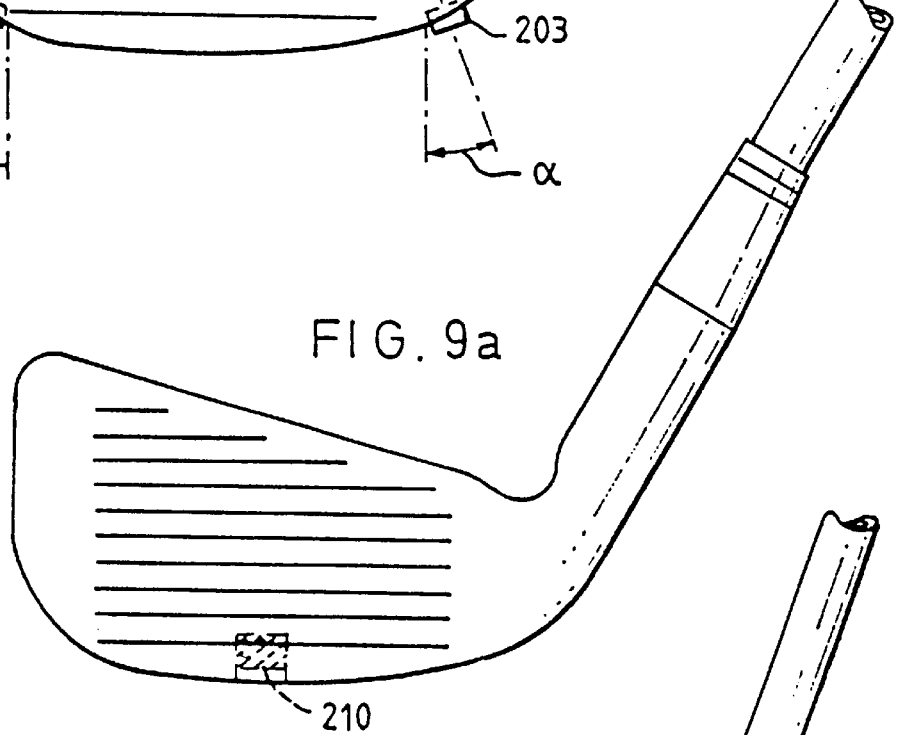
FIGS. 9a and 9b show diagrammatically other details of possible magnet placement.
Figure 9C:
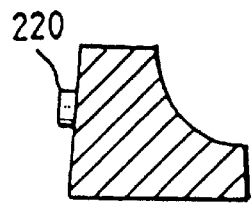

The simplification of magnet location number and placement can be further pursued, for a less-demanding custom-fitting diagnosis of speed and dynamic loft, using a single sole-located central magnet 210, as shown in FIG. 9a. In practice, with suitable data processing a magnet with magnetic axes horizontal, vertical or inclined could be used but of course a vertically oriented cylindrical magnet is preferable since it can be completely sunk into and adhered with a cylindrical bore, or simply adhered by magnetic attraction to a suitable portion of the club head.

Figure 9B:
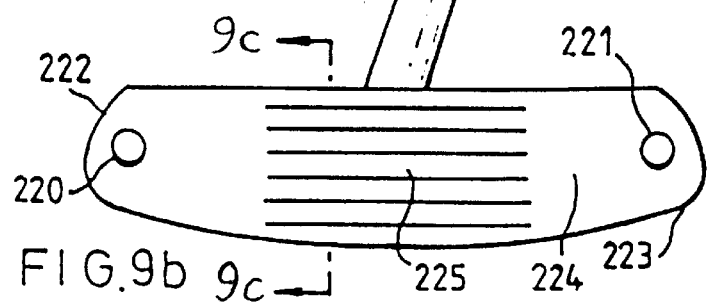

FIG. 9b shows another simplification, useful particularly for a putter, to give an indication of dynamic lie (shaft-rake). In this Figure magnets 220, 221 are widely spaced with magnetic axes horizontal and with end faces adhered to the extreme heel and toe regions 222, 223 of a putter face 224. This still gives an ample impact surface at 225. The club head can be readily constructed and repaired in a store (or home) environment, and is thus suitable for custom-fitting or competitive game purposes.

Figure 10:
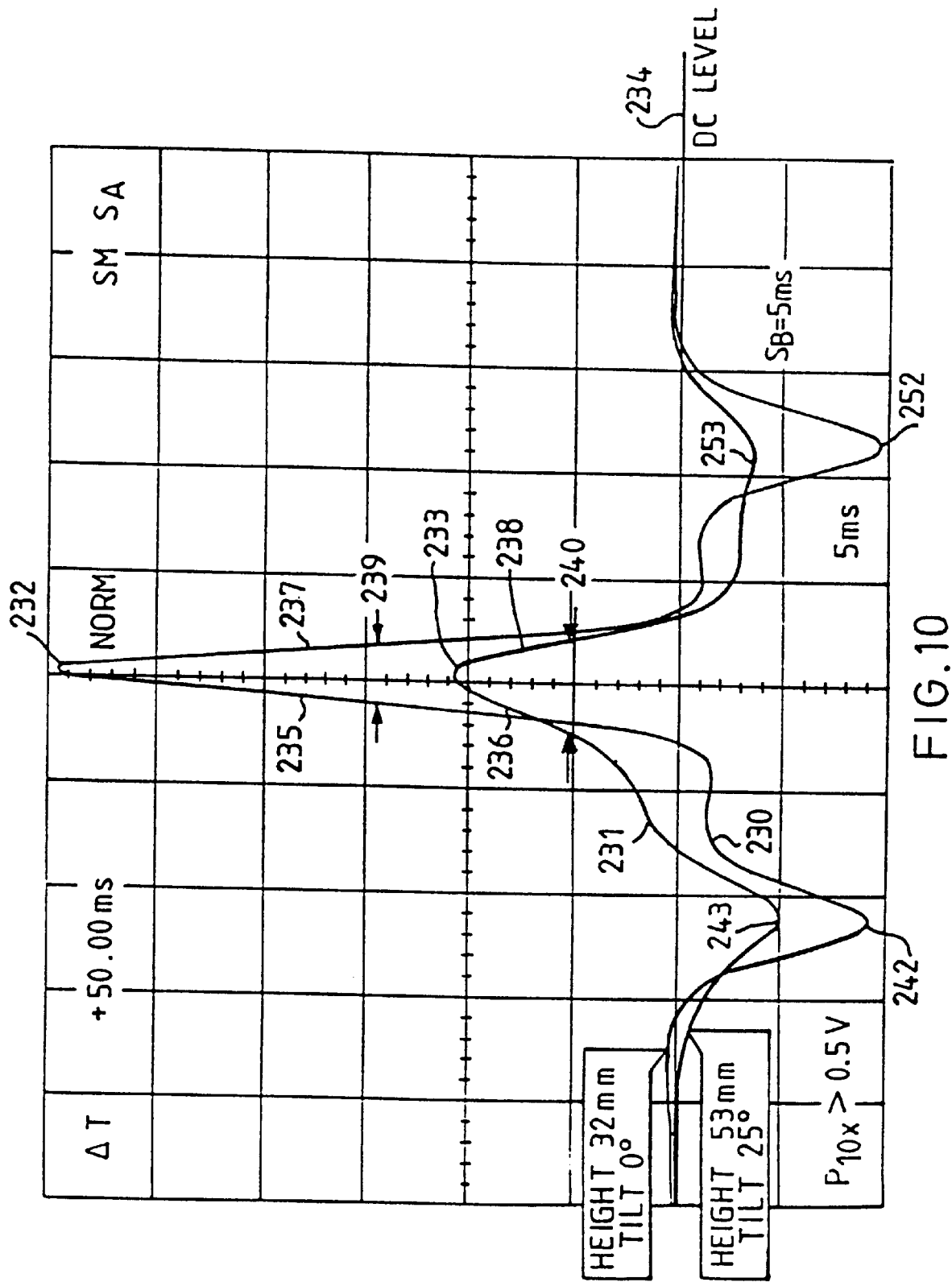
FIG. 10 shows for each curve the signal given by one magnet in the placement of FIG. 8, and in different swings, crossing a "figure-of-eight" loop, the magnets crossing at different heights and tilts above the notional ball position on the mat.

FIG. 10 shows two signal waveforms 230, 231 plotted on the same amplitude scale and timebase scale. These waveforms have major peaks at 232 and 233 and the quiescent or DC amplitude level for both signals is shown at 234. The waveforms of FIG. 10 also each have one major positive peak 232, 233 and two lesser negative peaks 242, 243 and 252, 253. These pairs of peaks are analogous to the zero crossing points in FIG. 3, namely 35, 34 and 36 respectively. The peaks in FIG. 10 and the zero crossings in FIG. 3 correspond to the points in time at which, in FIG. 2, the magnet 22 (which is shown with magnetic axis horizontal, but which alternatively may be orthogonal to the plane of the figure-of-eight) crosses the boundary 24 and its front and rear edges 21a, 21b. Thus features in one waveform type, generated with magnetic axis orthogonal to the figure-of-eight plane, are analogous to features in the alternate waveform type, generated with magnetic axis horizontal to the figure-of-eight plane.

Features of particular interest in FIG. 10 are the time and amplitude co-ordinates of the peaks 232, 233 (which are respectively analogous to the time co-ordinate and the slew rate or slope of the zero crossing point 35 in FIG. 3), the slew rate or slope of the leading edges 235, 236 and of the trailing edges 237, 238 of each major pulse (which are analogous to the amplitudes of the leading and lagging peaks 30, 31 in FIG. 3) and lastly the time duration of each pulse, or pulse widths 239, 240, measured at given amplitude co-ordinates which are some fixed proportion (e.g. half) of the respective peak amplitudes. The pulse widths being analogous to the time separation between leading and lagging peaks 30, 31 in FIG. 3).

In FIG. 10, measurement of the peak amplitudes at 232 and 233 (relative to the quiescent level 234) show these to be 5.90 major scale divisions and 2.15 major divisions respectively, (within some measurement uncertainty). Similarly, the pulse widths 239 and 240 are found to be 0.54 and 0.89 major scale divisions respectively. Relating these waveform measurements to the known heights of the magnet line of travel (32 millimeters and 53 millimeters as indicated in FIG. 10), it can be seen that the ratio of the peak amplitudes is inversely proportional to the square of the ratio of the magnet heights, and that the ratio of the pulse widths is directly proportional to the ratio of the magnet heights. This leads to a method of measuring the magnet speed using features from only one signal derived from one loop circuit. Since the magnet height at a given speed of travel can be ascertained by the relative pulse shape only, the variation in pulse amplitude related to height variation can be estimated and, assuming that the magnet strength and measurement gain characteristics are known, the speed of magnet travel can be related to the pulse peak amplitude (corrected for height variation). This can also be implemented using analogous features in the signal from of FIG. 3. In practice this would not be a preferred method for accurate speed measurement, as great consistency in magnet strengths and amplifier gains is difficult to achieve.

Several of the present golf swing parameter measurements rely on accurate detection of the instant at which a toe or heel magnet crosses above a given sensor boundary. In FIG. 10 this instant is determined by the exact time co-ordinate of a major peak, 232 or 233. In typical implementations of the invention, measurements of the waveform are taken at successive sampling intervals and subsequently processed as digital data. It is very improbable that an exact peak measurement will coincide with any instant of measurement sampling. To obtain reliable and accurate estimates of peak timings, the digital process uses a suitable method of numerical differentiation applied to several data samples at or near the waveform peak.

Whereas the planar arrays of loops described herein and in our prior application are considered to be practical and effective, it is realised that a wide range of alternate loop configurations and sensor types could achieve similar elongate form and improved degree of magnetic field coupling. For example, the sensors could comprise various loops or coils disposed vertically, horizontally or in a combination, and occupying a volume below the playing surface. Magnetic field detection methods may also employ suitably shaped elements of low reluctance magnetic material with either field coil sensing or other sensing devices such as Hall-effect devices or magnetic-resistive devices. An arrangement based on the above principles is described in our priority application No. 9113188.8.

Other arrangements, based on the preferred planar loops configuration but using two or more sensor planes to extract more detailed information (by measuring the field in three dimensions) can be implemented, if complexity and cost are secondary.

I claim:

1. An apparatus for detecting, measuring and/or displaying differences from desired ideal performance characteristics of a golf club swing, comprising; at least one golf club including a club head having a club face, the golf club having attached in relation to the club head at least one permanent magnet at a predetermined location and orientation relative to the club face; a detector array having a ball-position indication, and comprising at least one sensor, for a magnetic field, located in a predetermined sensing position relative to a desired ideal path of the club head over the ball position indication; and readout means electrically connected to the detector array to convert one or more electrical signals produced by the sensor by a swing of the golf club into a detection signal, comprising: the sensor being a plane loop means to provide at least two loop portions arranged in a figure eight configuration, one of said portions having a forward element and said other portion having a rear element, said loop portion elements being located side by side at a central portion of the figure eight configuration being disposed transversely to an ideal path; the rear element being substantially parallel to and generally closely spaced apart from the forward element as compared with a typical height of magnet travel over said elements for defining therebetween a notional center line disposed relative to a path defined by the golf club swing is sensed to enable the club head magnet to interact with said forward and said rear loop elements to produce a swing indication signal having three teaks at one polarity and three peaks at an opposite polarity with three zero cross over points so that the perceived cross over time at a notional center line is accurate due to the symmetrical unitary figure-eight configuration over a range of magnet pass over heights relative to said loop means.

2. Apparatus as claimed in claim 1 in which the at least two loop portions are parallelogram loop portions.

3. Apparatus as claimed in claim 2 in which the parallelogram loop portions are rectangular.

4. Apparatus as claimed in claim 2 in which the loop configuration includes a single length of conductor material having free ends and shaped into the at least two loop portions with electrical insulation at any crossover point and with the free ends connected to the readout means.

5. Apparatus as claimed in claim 3 in which the loop configuration includes two separate and identical side-by-side loop portions each having free ends connected to readout means for processing and readout, the apparatus including means to permit signal summation.

6. Apparatus as claimed in any one preceding claim comprising a plurality of loops at predetermined locations and orientation in relation to the ball indication position, each one of the plurality of loops being electrically insulated from one another and collectively therefore permitting a multiplicity of separate signals to be detected for measurement and/or display characterized in that at least one of the plurality of loops is configured as a parallelogram loop portion.

7. Apparatus as claimed in claim 1 in which the golf club comprises a single magnet.

8. Apparatus as claimed in claim 7 in which the single magnet is located in a central plane of the golf club, the central plane being the plane in which a hit ball will generally travel.

9. Apparatus as claimed in claim 8, in which the single magnet is located in a sole portion of the golf club.

10. Apparatus as claimed in claim 8 in which the single magnet is located at a back portion of the golf club.

11. Apparatus as claimed in claim 1 in which the golf club comprises two magnets.

12. Apparatus as claimed in claim 11 in which the two magnets are located in a sole portion of the golf club.

13. Apparatus as claimed in claim 12 in which the two magnets are located respectively at a toe portion and a heel portion, in the sole portion of the golf club.

14. Apparatus as claimed in claim 11 in which the two magnets are located at a back portion of the golf club.

15. Apparatus as claimed in claim 11 in which the golf club is a putter, and in which the two magnets are located at the club face of the golf club.

16. Apparatus as claimed in claim 11 in which the respective magnets are attached to the golf club in opposed magnetic senses.

17. Apparatus as claimed in claim 11 in which the respective magnets are attached to a sole portion of the golf club in the same magnetic sense.

18. Apparatus as claimed in claim 11 in which the two magnets are located in a sole portion of the golf club, one of the magnets at a heel region and another one of the magnets at a toe region and each one of the magnets inclined, at an angle $\alpha$ of 10°–40°, inwardly at respective upper ends of each of the magnets.

19. Apparatus as claimed in claim 1 in which the golf club is a putter and two magnets are attached, one to either side of an impact area, at the club face of the golf club.

20. Apparatus as claimed in claim 1 in which the golf club is a wood or iron with a single magnet recessed into a sole portion of the club head.

21. Apparatus as claimed in claim 11 in which each magnet is held in a recess in the club head.

22. Apparatus as claimed in claim 11 in which each magnet protrudes from the club head.

23. Apparatus as claimed in claim 11 in which each magnet is adhered to the club head.

24. A diagnostic golf club comprising a club head for use with a figure eight loop configuration having a sensed position defined by substantially parallel and substantially closely spaced apart center elements of adjacent loop portions and suitable as a wood or iron, said closely spaced apart center elements being spaced by a short distance as compared with the typical height of magnet travel over said elements, the club having two magnets, located in recesses spaced to either side of the central plane of the head at about extreme ends thereof, being the plane in which a hit ball will generally travel, at the heel and toe regions of the sole portion of the club, with magnetic axes lying generally in that plane perpendicular to the line of travel of the club head and inclined inwardly at 10°–40° at their upper ends, wherein the spacing between the magnets and the inclination thereof reduces signal cross-talk between the magnets as said magnets cross over the sensed position to enable the club head magnets to interact with said center elements to produce a swing indication signal having three peaks at one polarity And three peaks at an opposite polarity with three zero cross over points so that the perceived cross over time at a notional center line between the elements is accurate due to the symmetrical unitary figure-eight configuration over a range of magnet pass over heights relative to said loop configuration.

25. A method for selecting an optimized golf club for a user which comprises the steps of: providing a plurality of available golf clubs, each one of the plurality of available golf clubs having a distinct user characteristic; using at least one diagnostic golf club having a head of predetermined characteristics, the diagnostic golf club having located at the head thereof at least one magnet at a predetermined location and orientation relative to a club face of the head; using a diagnostic apparatus including a detector array, a sensor having a plane loop configured to provide at least two substantially identical loop portions arranged in a figure eight, and readout means connected to the detector array to convert one or more electrical signals produced by the sensor by a swing of the diagnostic golf club into a detection signal; executing at least one swing by the user of the diagnostic club in cooperation with the diagnostic apparatus; determining a swing characteristic based on detection signals corresponding to said at least one swing, said detection signal having three peaks at one polarity and three peaks at an opposite polarity with three zero cross over points; said determining including determining the speed and height of the magnet relative to the sensor; determining from the speed and height and height and tilt characteristic of the swing of the user; displaying diagnosed results corresponding to said swing characteristic; and selecting a chosen club from the plurality of golf clubs to optimize the performance of the user, wherein said distinct user characteristic of said selected club corresponds to said swing characteristic.

26. A method as claimed in claim 25, further including using a look-up table to help select the optimized golf club to optimize the performance of the user.

* * * * *

UNITED STATES PATENT AND TRADEMARK OFFICE
CERTIFICATE OF CORRECTION

PATENT NO. : 5,935,014
DATED : August 10, 1999
INVENTOR(S) : NORMAN M. LINDSAY

It is certified that error appears in the above-identified patent and that said Letters Patent is hereby corrected as shown below:

Col. 13, line 7, after comprising, delete "semicolon" and insert --:--.

Col. 13, line 31, delete "teaks" and insert --peaks--.

Col. 14, line 58, delete "AND" and insert --and--.

In the abstract, line 4, "or" should be --for--.

Signed and Sealed this

Twenty-eighth Day of March, 2000

Attest:

Q. TODD DICKINSON

*Attesting Officer*   *Commissioner of Patents and Trademarks*